United States Patent [19]
Geckeler

[11] 4,179,188
[45] Dec. 18, 1979

[54] GRADIENT OPTICAL FIBER

[75] Inventor: Siegfried Geckeler, Munich, Fed. Rep. of Germany

[73] Assignee: Siemens Aktiengesellschaft, Berlin & Munich, Fed. Rep. of Germany

[21] Appl. No.: 921,495

[22] Filed: Jul. 3, 1978

[30] Foreign Application Priority Data

Jul. 18, 1978 [DE] Fed. Rep. of Germany ....... 2732444

[51] Int. Cl.² .............................................. G02B 5/14
[52] U.S. Cl. .................................................. 350/96.31
[58] Field of Search ........................................ 350/96.31

[56] References Cited

U.S. PATENT DOCUMENTS 4,057,320   11/1977   Marcatili .......................... 350/96.31

OTHER PUBLICATIONS

Geckeler, Applied Optics, vol. 17, No. 7, Apr. 1978, pp. 1023–1029.
Geckeler, Electronics Letters, vol. 13, No. 15, Jul. 1977, pp. 440–442.
Marcatili, Bell Systems Technical Journal, vol. 56, No. 1, Jan. 1977, pp. 49–63.
Arnaud, Bell Systems Technical Journal, vol. 54, No. 7, Sep. 1975, pp. 1179–1205.
Presby et al., Applied Optics, vol. 15, No. 12, Dec. 1976, pp. 3029–3036.
Geckeler, Electronics Letters, vol. 13, No. 1, Jan. 1977, pp. 29–31.

Primary Examiner—Stewart J. Levy
Attorney, Agent, or Firm—Hill, Van Santen, Steadman, Chiara & Simpson

[57] ABSTRACT

A gradient optical fiber with an optimized index of refraction profile characterized by the normalized difference in the index of refraction $\Delta$ is in a range of 0.005 to 0.011, with $-(k_o/\Delta \cdot d\Delta/dk_o)$ being in a range of 0.09 to 0.11, an index of refraction profile function f(r/a) according to a formula of $f(r/a)=(r/a)^\alpha+A((r/a)^\alpha-(r/a)^{2\alpha})$ and a profile dispersion function $F_N$ according to $F_N = f^g$ wherein $\alpha$ is in the range of 2.013 to 2.015, A is in a range of 0.114 to 0.116, and g is in a range of 2.4 to 2.6.

2 Claims, 1 Drawing Figure

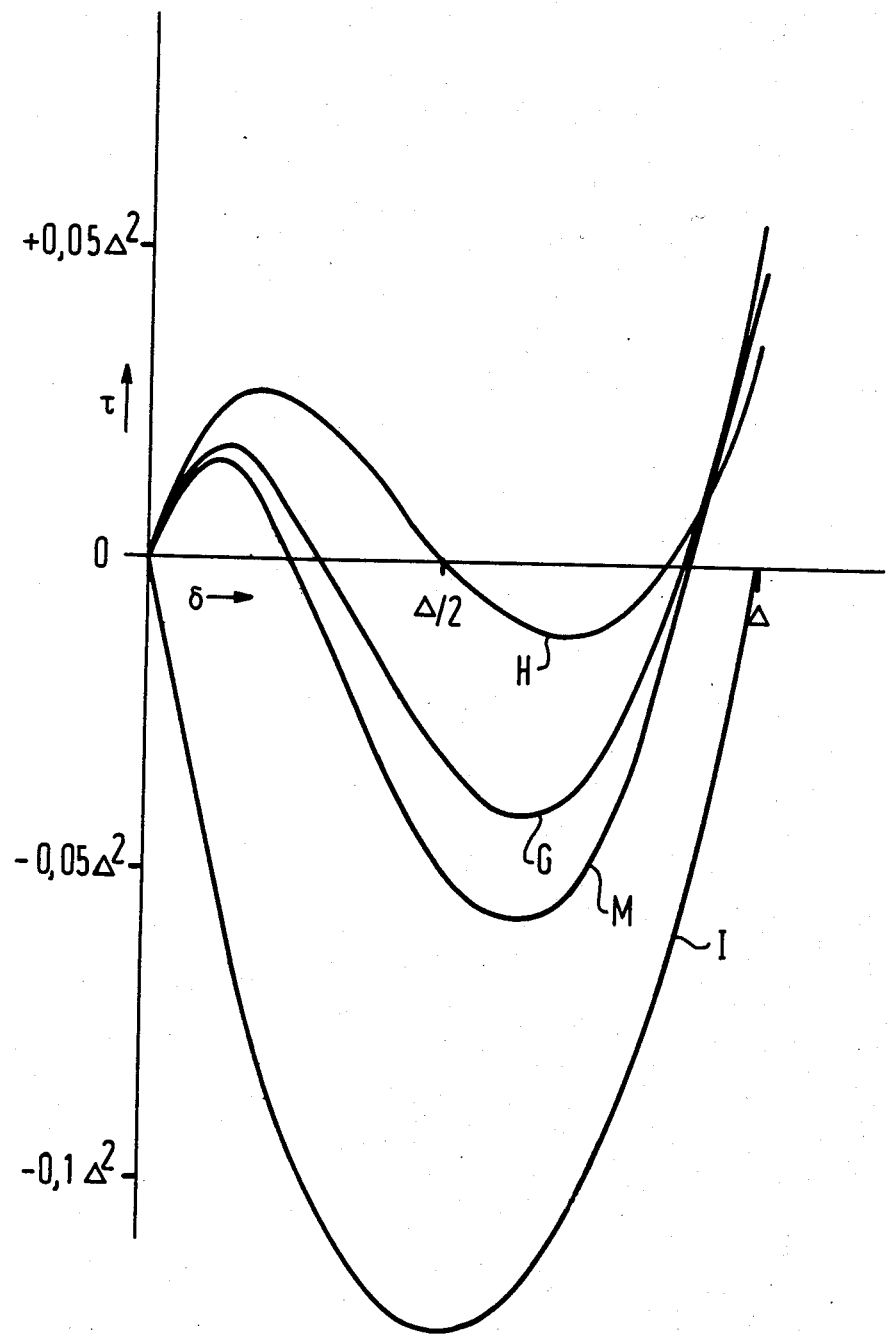

GRADIENT OPTICAL FIBER

BACKGROUND OF THE INVENTION

The present invention concerns a gradient optical fiber with an optimized profile for index of refraction.

The band width of multimode glass fibers for data transmission is limited by the fact that differences in transit time will occur between the many modes that can be propagated in each fiber. These differences between transit times can be kept small by giving the fiber a parabolic profile for the index of refraction. Since the form of the index of refraction profile is generally dependent on the wavelength of the light and since the light to be transmitted is not strictly monochromatic, the transit time equalization is made more difficult.

To date, the best attempt at optimizing the index of refraction profile while taking a profile dispersion into account has been disclosed in an article by E. A. J. Marcatili in *The Bell Systems Technical Journal*, Vol. 56, No. 1, Jan. 1977, pgs. 49–63. By adapting the index of refraction profile to a predetermined profile dispersion, the process of Marcatili aims to ensure that group transit time differences only exist between modes of differing propagation constant and not, as in the general case, between modes with the same propagation constant, as well.

SUMMARY OF THE INVENTION

The present invention is directed to providing a gradient optical fiber having an index of refraction profile with which transit time differences between different modes are greatly reduced.

To accomplish these tasks, the present invention is directed to a gradient optical fiber with an optimized index of refraction profile with the improvements being a normalized difference in the index of refraction $\Delta$ being in a range of 0.005 to 0.011, with $-(k_o/\Delta \cdot d\Delta/dk_o)$ being in a range of 0.09 to 0.11, an index of refraction profile function $f(r/a)$ according to a formula $$f(r/a) = (r/a)^\alpha + A((r/a)^g - (r/a)^{2\alpha})$$

and a profile dispersion function $F_N$ according to $$F_N = f,$$

wherein $\alpha$ being in a range of 2.013 to 2.015, A being in a range of 0.114 to 0.116 and g being in a range of 2.4 to 2.6.

Preferably, $\Delta$ is chosen to equal 0.01, $-(k_o/\Delta \cdot d\Delta/dk_o) = 0.1$, $\alpha$ is at least 2.014, A is at least 0.115 and g is at least 2.5.

With the index of refraction profile obtained hereinabove, transit time differences can be obtained which differences are substantially smaller than those which were obtained by the optimization of the method disclosed by Marcatili.

BRIEF DESCRIPTION OF THE DRAWING

The FIGURE shows the relationship between normalized transit time differences $\tau$ as a function of $\delta$ for various modes in a prior art fiber and in a fiber according to the present invention.

DESCRIPTION OF THE PREFERRED EMBODIMENT

The principle of the present invention is to provide a gradient optical fiber having an index of refraction profile in which the transit time differences between different modes have been greatly reduced in relation to the differences in previously known fibers.

The invention is based on the recent knowledge that a pair of functions $F_N$ and $f$ with a plurality of degrees of freedom can be optimized with particularly favorable results just when it does not satisfy Marcatili's optimization condition.

The invention is based on the following considerations: the index of refraction n in a gradient optical fiber is a function of the radius r described by $$n^2(r) = n_o^2(1 - 2\Delta \cdot f(r/a)); \quad o \leq r \leq a \quad (1)$$

with fiber core radius a and profile function f. When $r=o$, $f=o$ and $n=n_o$, when $r=a$, $f=1$ and $n=n_a$. Thus, the normalized index of refraction difference is $$\Delta = (n_o^2 - n_a^2)/2n_o^2 \approx (n_o - n_a)/n_o \quad (2)$$

The parameters $n_o$, $\Delta$ and f in equation (1) depend upon the wavelength $\lambda$ of the light. The group transit time $t_{go}$ of the basic mode of a fiber of length L is $$t_{go} = Ln_o/C \cdot (1 - \lambda/n_o \cdot dn_o/d\lambda) \approx Ln_o/C \quad (3)$$

wherein C is the speed of light and $\lambda$ the wavelength of the light in the open. In addition to the basic mode, many other modes of differing group transit time can be propagated in a multimode fiber $(a \gg \lambda)$. The group transit time differences between the modes can be largely equalized (to the order of $t_{go} \cdot \Delta^2$) by optimizing the index of refraction profile of equation (1). Complete equalization is physically impossible. A coarse approximation for the optimum profile is $f = (r/a)^2$ and the object of the present invention is the best possible optimization.

The total number of modes M that can be propagated in the optimum profile is $$M \approx \Delta/2 \cdot (n_o \cdot 2\pi \cdot a/\lambda)^2 \quad (4)$$

The propagation constant $\beta$ of a mode is $$\beta = k_o\sqrt{1-2\delta}; \quad o \leq \delta \leq \Delta \ll 1 \quad (5)$$

where $\delta$ is an integer multiple of $\Delta/\sqrt{M}$ and the wave number $$k_o = n_o \cdot 2\pi/\lambda \quad (6)$$

defines the upper limit for $\beta$. For each $\beta$ or $\delta$ there is an associated group of $(\delta/\Delta) \cdot 2\sqrt{M}$ modes with identical $\beta$ but possibly differing group transit time. The group transit time of a mode is $$t_g = t_{go} \cdot d\beta/dk_o = t_{go} \cdot (1+\tau) \quad (7)$$

where $\tau$ expresses its difference in relation to $t_{go}$ and it is expediently calculated using a method that is described in an article published in The Bell Systems Technical Journal, Vol. 54, No. 7, Sept. 1975, pgs. 1179–1205 for the specific case of a profile function f independent of wavelength and which has been extended for the general case. With this method the dependence of $\Delta$ on the wavelength is allowed for by $$P = -k_o/\Delta \cdot d\Delta/dk_o = -(k_o/\lambda \cdot d\lambda/dk_o) \cdot (\lambda/\Delta d\Delta/d\lambda) \approx +\lambda/\Delta d\Delta/d\lambda \quad (8)$$

and the dependence of f (non-linear profile dispersion) on the wavelength by $$Q = 1 - 2\Delta \cdot f - k_o/2 \partial/\partial k_o (2\Delta \cdot f) = 1 - 2\Delta \cdot f + P \cdot \Delta \cdot F_N \quad (9)$$

In the specific case $\partial f/\partial \lambda = 0$, $F_N = f$ and $Q = 1 - (2-P) \cdot \Delta$ f; in the general case the following applies $$P \cdot \Delta \cdot F_N = \frac{n^2}{n_o^2} \left( \frac{\frac{\lambda}{n_o} \frac{dn_o}{d\lambda} - \frac{\lambda}{n} \frac{\partial n}{\partial \lambda}}{1 - \frac{\lambda}{n_o} \frac{d^n a}{d\lambda}} \right); n = n(r, \lambda) \quad (10)$$

and $$Q = \frac{n^2}{n_o^2} \left( \frac{1 - \frac{\lambda}{n} \frac{\partial n}{\partial \lambda}}{1 - \frac{\lambda}{n_o} \frac{dn_o}{d\lambda}} \right) \quad (11)$$

The best known optimization condition (see Marcatili) for profile function f is $$\frac{2\Delta \cdot f + \frac{r}{2} \frac{\partial}{\partial r}(2\Delta \cdot f)}{2\Delta \cdot f + \frac{k_o}{2} \frac{\partial}{\partial k_o}(2\Delta \cdot f)} = D(\lambda) \quad (12)$$

This means: the dependence of f upon radius and its dependence on wavelength must be so adjusted one relative to the other that $D(\lambda)$ becomes independent of the radius. If this is successful, we obtain $$\frac{d\beta}{dk_o} = 1 + \tau = \frac{1}{\sqrt{1-2\delta}} \cdot (1 - \frac{2\delta}{D}) \quad (13)$$

then not only $\beta$ but also $d\beta/dk_o$ is clearly defined by $\delta$. All modes with the same $\delta$ than have the same group transit time; differences in transit time only occur between modes with different $\delta$ and they become minimal for $D \approx 2 - \Delta$. One known special case with equation (12) is $f = (r/a)^\alpha$ with the profile exponent $\alpha$ independent of wavelength for which the result is $D = (2+\alpha)/(2-P)$. In this case $\alpha \approx 2 - 2P - \Delta \cdot (2-P)$ follows from $D \approx 2 - \Delta$.

It has been found experimentally (see Applied Optics 15 (1976), pgs. 3029-3036) that $F_N$ is a non-linear function of f which can be affected by the composition of the glasses from which the fiber is constructed. With the aid of equations (9) and (12) one can establish Marcatili's optimum profile function f for a predetermined $F_N$.

Considerably smaller transit time differences are obtainable if one optimizes not just f but also $F_N$. Here the condition of equation (12) has to be disregarded so that transit time differences arise not just between modes with differing $\delta$ but also between modes with the same $\delta$; however, they can be balanced out very advantageously if f and $F_N$ contain adequate degrees of freedom for dimensional selection. The optimization indicated here is based on three degrees of freedom $\alpha$, A, g, the functions $$f(r/a) = (r/a)\alpha + A((r/a)\alpha - (r/a)^{2\alpha}) \quad (14)$$

and $$F_N = f^g \quad (15)$$

and the values $\Delta = 0.01$ and $-(k_o/\Delta \cdot d\Delta/dk_o) = 0.1$. The optimum is to be found with the values $\alpha = 2.014$, $A = 0.115$ and $g = 2.5$.

The curves M, H and G in the figure represent the normalized group transit time difference $\tau$ in a fiber according to the invention as a function of $\delta$ for the two extreme modes, which are a meridional beam or ray (M) and helix beam or ray (H) and for the average (G) of all other modes which are scattered over the area between the H- and the M-curve. For comparison $\tau(\delta)$ is shown in the figure for $f = (r/a)^\alpha$ and $D \approx 2 - \Delta$ (optimized in accordance with equation 12 and 13) and reproduced as curve I in which the H,G, M-curves coincide in this case. The improvement, which is obtainable in accordance with the invention, is clearly visible.

An even closer approximation to the ideal case $\tau = 0$ would be possible by using a larger number of degrees of freedom.

Although various minor modifications may be suggested by those versed in the art, it should be understood that I wish to employ within the scope of the patent warranted hereon, all such modifications as reasonably and properly come within the scope of my contribution to the art.

I claim:

1. A gradient optical fiber with an optimized index of refraction profile with the improvement being a normalized difference in the index of refraction $\Delta$ being in a range of 0.005 to 0.011, with $-(k_o/\Delta \cdot d\Delta/dk_o)$ being in a range of 0.09 to 0.11, an index of refraction profile function f(r/a) according to a formula of $$f(r/a) = (r/a)^\alpha + A((r/a)^\alpha - (r/a)^{2\alpha})$$

and a profile dispersion function $F_N$ according to $$F_N = f^g,$$

wherein $\alpha$ being in a range of 2.013 to 2.015, A being in a range of 0.114 to 0.116 and g being in a range of 2.4 to 2.6.

2. A gradient optical fiber according to claim 1, wherein $\Delta = 0.01$, $-(k_o/\Delta \cdot d\Delta/dk_o) = 0.1$, $\alpha$ is at least 2.014, A is at least 0.115 and g is at least 2.5.

* * * * *